US008903936B2

(12) United States Patent
Martin et al.

(10) Patent No.: US 8,903,936 B2
(45) Date of Patent: Dec. 2, 2014

(54) SHARING USER DEFINED LOCATION BASED ZONES

(75) Inventors: Daryl Joseph Martin, Paradise (CA); Christopher David O'Keefe, St. John's (CA); Ahmed E. Hassan, Waterloo (CA)

(73) Assignee: BlackBerry Limited, Waterloo, Ontario ( * ) Notice: Subject to any disclaimer, the term of this patent is extended or adjusted under 35 U.S.C. 154(b) by 881 days.

(21) Appl. No.: 11/614,188

(22) Filed: Dec. 21, 2006

(65) Prior Publication Data
US 2008/0155027 A1 Jun. 26, 2008

(51) Int. Cl.
G06F 15/16 (2006.01)
G06F 15/167 (2006.01)
H04L 29/08 (2006.01)
G01C 21/00 (2006.01)
H04W 4/02 (2009.01)
G06F 17/30 (2006.01)

(52) U.S. Cl.
CPC ............... *G01C 21/00* (2013.01); *H04L 67/18* (2013.01); *H04W 4/02* (2013.01); *G06F 17/30575* (2013.01); *H04L 67/2819* (2013.01)
USPC ........................... 709/213; 709/203; 709/206

(58) Field of Classification Search
CPC ........................... H04W 4/025; G06F 17/3075
USPC ................................................... 709/213
See application file for complete search history.

(56) References Cited

U.S. PATENT DOCUMENTS

| | | | |
|---|---|---|---|
| 2002/0035609 A1* | 3/2002 | Lessard et al. | 709/217 |
| 2002/0103892 A1* | 8/2002 | Rieger, III | 709/223 |
| 2003/0100326 A1* | 5/2003 | Grube et al. | 455/515 |
| 2004/0142656 A1* | 7/2004 | Bensimon et al. | 455/3.06 |
| 2005/0260996 A1* | 11/2005 | van de Groenendaal | 455/445 |
| 2006/0167940 A1* | 7/2006 | Colton et al. | 707/104.1 |
| 2007/0171046 A1* | 7/2007 | Diem | 340/539.13 |
| 2007/0281689 A1* | 12/2007 | Altman et al. | 455/435.1 |
| 2007/0288164 A1* | 12/2007 | Gordon et al. | 701/213 |
| 2008/0104178 A1* | 5/2008 | Agrawal et al. | 709/206 |

FOREIGN PATENT DOCUMENTS

| | | |
|---|---|---|
| WO | 0077662 A | 12/2000 |
| WO | WO/00/77662 | 12/2000 |
| WO | 0217567 A2 | 2/2002 |
| WO | WO/02/17567 | 2/2002 |

OTHER PUBLICATIONS

European Search Report issued by the European Patent Office on Jan. 6, 2007 in regards to European Patent Application No. 06126917.1.

(Continued)

*Primary Examiner* — Shaq Taha
(74) *Attorney, Agent, or Firm* — Gowling Lafleur Henderson LLP

(57) ABSTRACT

A method is provided for sharing data, stored on a central data store, between a first user and a secondary user. The method comprises the following steps. A share request message is received from the first user. The share request message includes a data identifier for identifying which of the data stored on the central data store is to be shared with the secondary user, and a user identifier for identifying the secondary user. The data to be shared is associated with an account of the secondary user for subsequent access by the secondary user. A system and computer readable medium configured to implement the method are also described.

20 Claims, 5 Drawing Sheets

(56) References Cited

OTHER PUBLICATIONS

Extended European Search Report issued by the European Patent Office dated Nov. 13, 2009 for corresponding European Application No. 09169619.5.
European Examination Report issued by the European Patent Office dated Apr. 8, 2008 for corresponding European Application No. 06126917.1.
European Examination Report issued by the European Patent Office dated Jun. 14, 2007 for corresponding European Application No. 06126917.1.
EP office Action—Aug. 27, 2010.
Corresponding Canadian Office Action Application No. 2,615,202 dated Feb. 17, 2011.
Corresponding Canadian Office Action Application No. 2,615,202 dated Apr. 16, 2012.

* cited by examiner

SHARING USER DEFINED LOCATION BASED ZONES

The present disclosure relates generally to mapping applications and specifically to providing information to users of such applications in accordance with user defined zones.

BACKGROUND

With the recent advancements of Global Positioning System (GPS) devices, integration between compact GPS receivers and mobile devices, such as cell phones and portable digital assistants (PDAs), is becoming popular. This merger of technology provides many different possibilities for users of the mobile devices, as their devices can perform tasks that were not previously possible. This includes, for example, the ability to providing a mapping application on the mobile device.

Custom zones can be created to provide a user with an improved interactive experience using the mobile device. In order to further improve the use of custom zones, it would be beneficial to share custom zones between users. However, due to the possible size of data associated with a custom zone, an efficient method is needed to share custom zone data with other users.

Providing a user friendly, low cost method of sharing zones would give the user the ability to share his/her experiences and custom zones with other people without incurring a significant cost. Accordingly, this feature would likely assist in the sales of the mobile devices as users try to convince others to participate and share data.

BRIEF DESCRIPTION OF THE DRAWINGS

Embodiments will now be described by way of example only with reference to the following drawings in which.

DETAILED DESCRIPTION OF THE PREFERRED EMBODIMENTS

In accordance with one embodiment there is provided a method of sharing data, stored on a central data store, between a first user and a secondary user, the method comprising the steps of: receiving a share request message from the first user, the share request message including a data identifier for identifying which of the data stored on the central data store is to be shared with the secondary user, and a user identifier for identifying the secondary user; and associating the data to be shared with an account of the secondary user for subsequent access by the secondary user.

In accordance with another embodiment, a server is configured to implement the method. In accordance with yet another embodiment, a computer readable medium comprises instructions for executing the method.

Figure 1:
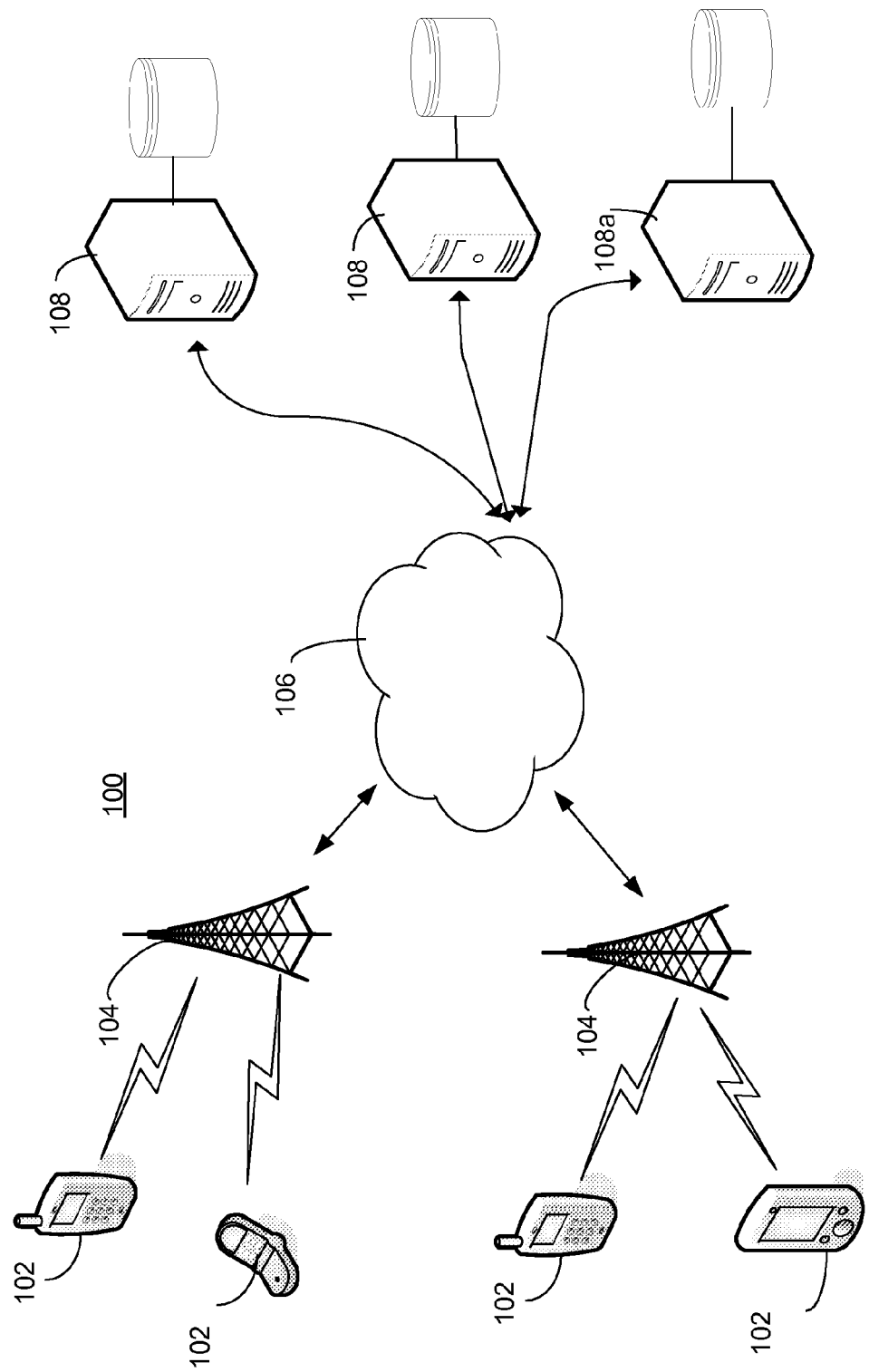
FIG. 1 is a block diagram illustrating a telecommunication infrastructure (prior art)

For convenience, like numerals in the description refer to like structures in the drawings. Referring to FIG. 1, a typical telecommunication infrastructure is illustrated generally by numeral 100. The telecommunication infrastructure 100 includes a plurality of mobile devices 102, a plurality of base stations 104, a communication network 106 and a plurality of network servers 108.

The mobile devices 102 include wireless computing devices such as a smart phone, a personal digital assistant (PDA), a GPS enabled trip computer in a vehicle and the like. The mobile devices 102 are in communication with one of the base stations 104. The base stations 104 relay data between the mobile devices 102 and the network servers 108 via the communication network 106. Accordingly, the communication network 106 may include several components such as a wireless network, a relay, a corporate server and/or a mobile data server for relaying data between the base stations 104 and the network servers 108.

The network servers 108 include servers such as a Web server, an application server, and an application server with web services. An example of an application server 108 is a location based server 108a. Location based servers 108a use position information relating to a user's location with intelligent applications and solutions to provide relevant information and services to the user. For example, a mapping application executing on the mobile device 102 may retrieve relevant mapping data for presenting to the user. The location based server 108a uses the position of the mobile device 102 to assist in determining the appropriate mapping data to transmit.

It will be appreciated by a person of ordinary skill in the art that the telecommunication infrastructure 100 described herein is exemplary and that changes may be made to one or more components to accommodate different network configurations without affecting the scope of the invention described and claimed herein.

Figure 2:
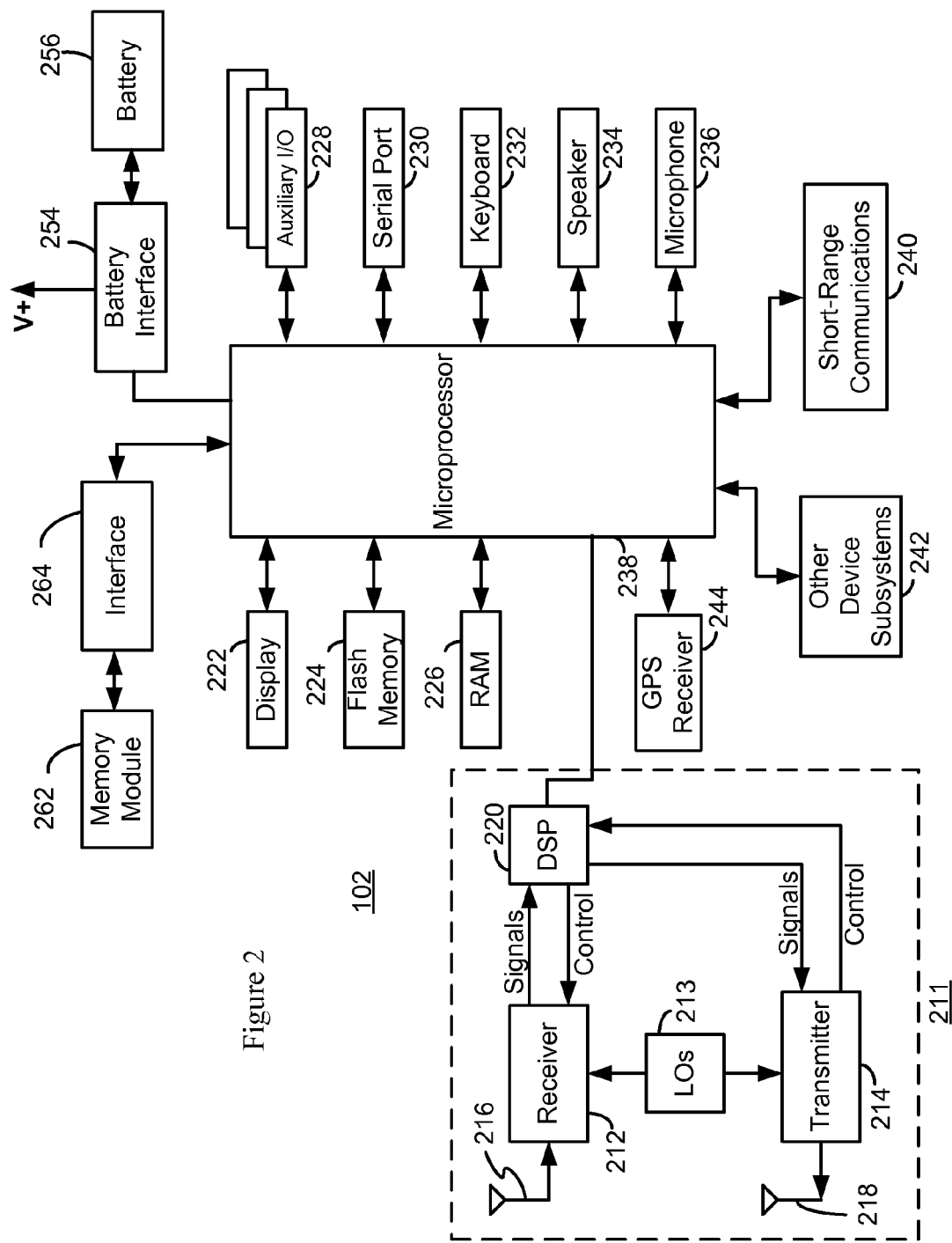
FIG. 2 is a block diagram illustrating components of a mobile device.

Referring to FIG. 2, a mobile device 102 is illustrated in greater detail. The mobile device 102 is often a two-way communication device having both voice and data communication capabilities, including the capability to communicate with other computer systems. Depending on the functionality provided by the mobile device 102, it may be referred to as a data messaging device, a two-way pager, a cellular telephone with data messaging capabilities, a wireless Internet appliance, or a data communication device.

The mobile device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which mobile device 102 is intended to operate.

The mobile device 102 includes a microprocessor 238 which controls general operation of the mobile device 102. The microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240 such as Bluetooth™ for example, and any other device subsystems or peripheral devices generally designated at 242. The mobile device 102 also includes a positioning device 244 for receiving positioning information.

The positioning device 244 may be a receiver, such as a GPS receiver for example, for receiving satellite broadcasts. In one embodiment, the satellite broadcast data is used by the mobile device 102 to determine its position. In another embodiment, the satellite broadcast data is transmitted from the mobile device 102 to one of the network servers 108 to determine the position of the mobile device 102. One such technique is known as assisted-GPS. In assisted-GPS, signalling information from a position determining entity is provided to the mobile device 102 to aid in position determination. As long as the mobile device 102 can connect with the network server 108, it can query its location from the network server 108.

Alternatively, the positioning device 244 may comprise a positioning module for receiving positioning information from one of the network servers 108. In this embodiment, the positioning module may comprise a software, rather than a hardware, solution.

Operating system software used by the microprocessor 238 is preferably stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, preferably enables execution of software applications on the mobile device 102. A predetermined set of applications, which control basic device operations, is installed on the mobile device 102 during its manufacture. These basic operations typically include data and voice communication applications, for example. Additionally, applications may also be loaded onto the mobile device 102 through the network 106, an auxiliary I/O subsystem 228, serial port 230, short-range communications subsystem 240, or any other suitable subsystem 242, and installed by a user in RAM 226, or preferably the persistent store 224, for execution by the microprocessor 238. Such flexibility in application installation increases the functionality of the mobile device 102 and may provide enhanced on-device features, communication-related features, or both.

The display 222 is used to visually present an application's graphical user interface (GUI) to the user. The user can manipulate application data by modifying information on the GUI using an input device such as the keyboard 232 for example. Depending on the type of mobile device 102, the user may have access to other types of input devices, such as, for example, a scroll wheel, trackball, light pen or touch sensitive screen.

In accordance with the present embodiment, a zone application is installed on the mobile device 102 for providing the user with an improved interface for location based services, such as a GPS mapping application. The zone application can be implemented as a standalone, or plugin, application that interfaces with a pre-existing mapping application or it can be incorporated into a new mapping application, as will be appreciated by a person of ordinary skill in the art.

The zone application provides the user with the ability to define one or more custom zones that are of relevance to the user. Each of the custom zones is defined by the user dynamically assigning a boundary to a region or area of interest. For example, the user can define a home zone comprising a local neighborhood including the user's home address. As another example, the user can define a work zone comprising a local neighborhood including the user's work address. Accordingly, it can be seen that the user can define a number of custom zones, as desired.

Figure 3:
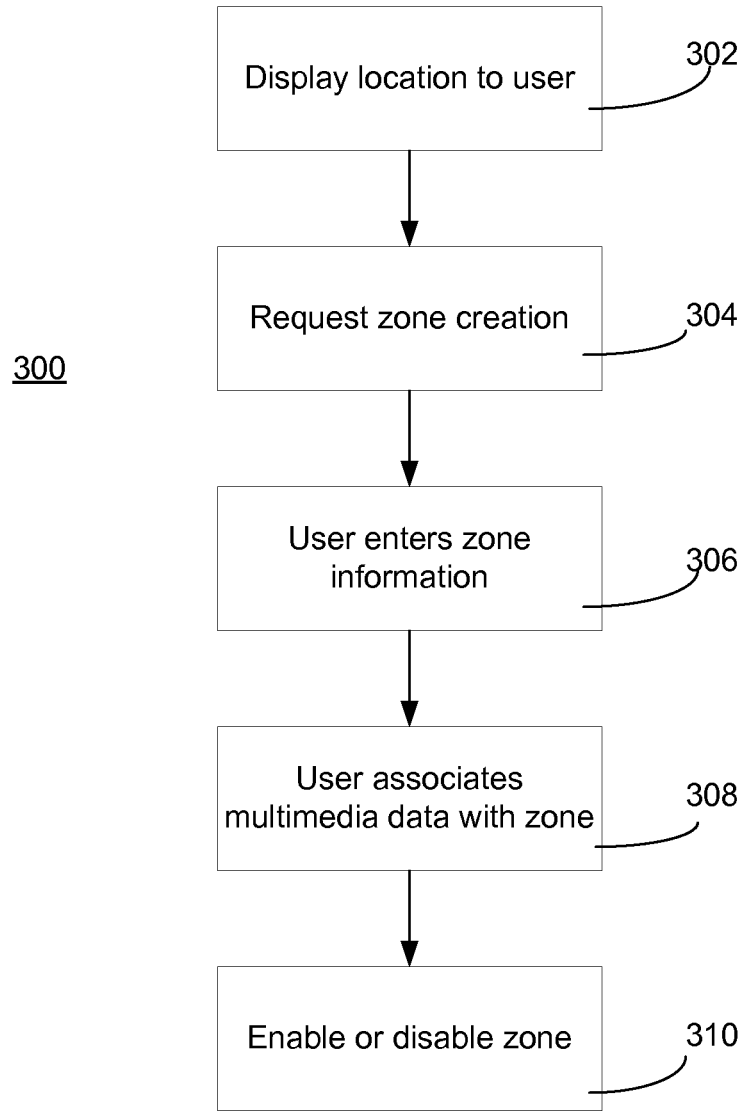
FIG. 3 is a flow diagram illustrating the steps for creating a custom zone.

Referring to FIG. 3, a flow chart illustrating the steps used to create a custom zone is shown generally by numeral 300. In step 302, the user is presented with graphical or numerical representation of the user's location. In step 304, the user requests creating a custom zone using the zone application on the mobile device 102. As will be appreciated, this step can be implemented a number of different ways using the GUI on the mobile device 102.

In one embodiment, the user can actively seek to create a custom zone by selecting a "Create Zone" option provided in a menu list.

In another embodiment, the zone application can prompt the user with an option to create a custom zone upon arrival at a predefined location. In this embodiment, the zone application can include a list of locations predefined by the user. Alternative, the zone application can interface with a contact application to retrieve a list of locations. The retrieved list of locations may include, for example, all addresses in the contact application. Alternatively, the retrieved list may be filtered in accordance with user preferences.

In step 306, the zone application prompts the user for a name and boundary for defining the custom zone. The user is provided with a plurality of shapes such as a circle, square, rectangle, and the like, that can be used to define the boundary of the custom zone.

The user also provides dimensions of the selected shape to create the custom zone. For example, if the user selects a circle to define the boundary, the user defines the radius of the circle. In the present embodiment, the location of the user when the custom zone is created is used as the centre of each shape. It will, however, be apparent that the centre of the custom zone can be modified by the user so that it does not need to be symmetrical about the user's location. Alternatively, the selected shape is overlaid on the map and the user can manipulate the size and location of the shape using standard graphical manipulation techniques.

In step 308, once the custom zone has been defined, the user can associate one or more of a plurality of different multimedia data with it. For the purpose of the present description, the term multimedia data refers to data that may comprise one or many different forms. Accordingly, some multimedia data may include only one type of data, such as text for example. Conversely, other multimedia data may include a number of different forms such as video (in formats such as avi, mpeg, asf, and the like), audio (in formats such as mp3, wav, midi, cell phone rings and the like), images (in formats such as jpeg, gif tiff, and the like), and document files (for applications such as Microsoft Word, Microsoft Excel, Adobe Acrobat and the like) as well as text. The type of data included in the multimedia data associated with each of the custom zones is, primarily, defined by the user. In the present embodiment, the created custom zone and its associated multimedia data are stored in the persistent store on the mobile device 102.

In one example, the user creates a "home" zone for the user's home. The user can associate one or more pictures of the home or of the user's family with the home zone. Similarly, the user could supply a task list of tasks to perform around the home. In another example, the user creates a "restaurant" zone for a restaurant. The user can associate one or more pictures of the restaurant with the restaurant zone. Similarly, the user could provide notes on the restaurant, including food quality, service, price and the like.

The multimedia data associated with the custom zone can be created on the mobile device or retrieved from another source. For example, many mobile devices 102 are capable of capturing pictures and/or video. Further, notes can be created using the input device of the mobile device 102. Alternatively, multimedia data can be retrieved via an Internet browser or from e-mail, Multimedia Messaging Service (MMS) messages, and the like, received on the mobile device 102. It will be appreciated that the type of information associated with a custom zone is left to the user's discretion and may be limited only by the capability of the mobile device 102.

In step 310, the user can choose whether to have the custom zone enabled or disabled. Whether or not the custom zone is enabled will affect the operation of zone application as will be described in detail with reference to FIG. 4.

In an alternate embodiment, when the zone application prompts the user for a name and boundary 306, the user is provided with a lasso tool for defining the boundary of the custom zone. A lasso tool is a well known image editing tool that enables the user to perform freehand selection of an irregular shape that does not necessarily conform with a predefined shape.

In yet an alternate embodiment, when the zone application prompts the user for a name and boundary 306, the user defines the boundary of the custom zone by motion. In this embodiment, the mobile device 102 tracks the user's movement to define the boundary of the custom zone. Accordingly, the user is able to create custom zones of any size and shape depending on the movement.

Optionally, for the previous two embodiments, the zone application includes a smoothing/snap feature. Such a feature is common in design applications for completing a custom shape or area. If, for example, the boundary of the custom zone does not end where it started, the custom zone will not encompass an enclosed area. Therefore, the smoothing/snap feature joins the end point of the boundary to the start point of the boundary, creating an enclosed custom zone. The smoothing/snap feature may further modify the custom boundary to form an actual geographic shape if possible and if desired. The actual geographic shape created by the smoothing/snap feature most closely represents the custom shape created by the user.

Figure 4:
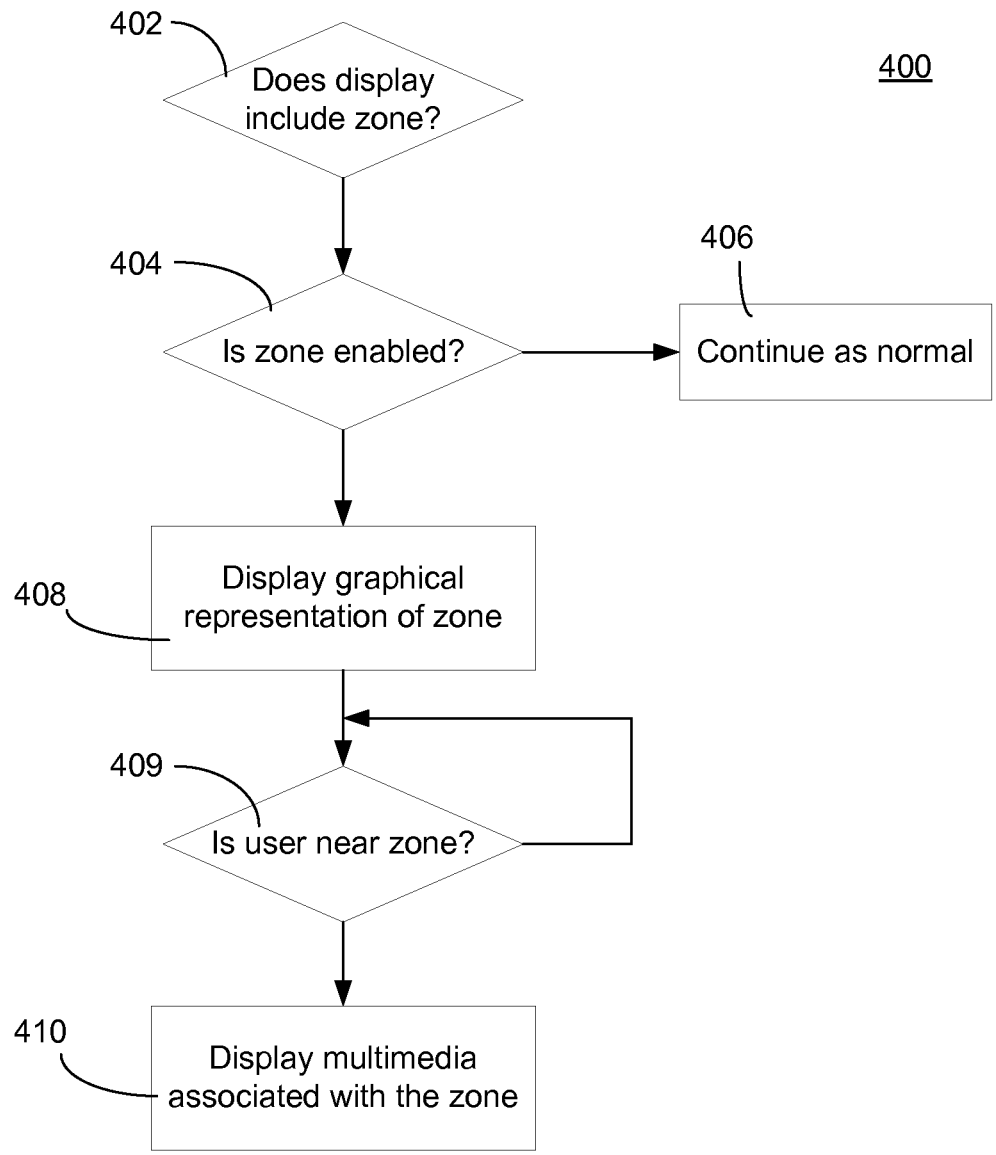
FIG. 4 is a flow diagram illustrating the steps for displaying the custom zone.

Once custom zones have been created, they can be used by the zone application to display information, other than basic map information to the user. Referring to FIG. 4, a flow chart illustrating the steps used to implement the custom zone in accordance with an embodiment is shown generally by numeral 400.

In step 402, the zone application determines when an area defined by one of the custom zones is displayed on the screen of the mobile device 102 as a result of tracking or panning. That is, depending on the scale of the map being displayed by the mapping application, the zone application determines when a portion of the map being displayed includes a custom zone.

In step 404, the zone application determines whether or not the custom zone is enabled.

If the custom zone is disabled, the zone application continues to step 406 and the area represented by the custom zone is displayed on the screen in a matter that is standard for the mapping application.

If the custom zone is enabled, the zone application continues to step 408 and displays a graphical representation of the area represented by the custom zone in order to identify the custom zone to the user. As will be appreciated, how the custom zone is represented can very depending on user preferences, zone application specifics, and the definition of the custom zone itself. In one embodiment, the custom zone boundary defined by the user is shaded or coloured on the map. In another embodiment, the custom zoned is represented on the map by an icon. For example, the "home" zone can be represented by a house icon and the "work" zone can be represented by a building icon.

In step 409, once the representation of the custom zone is shown on the map, the user navigates toward the custom zone. In the present embodiment this can be achieved in two ways. In a first approach, the user can physically travel to the custom zone. The mapping application tracks the user's progress and determines when the user enters the custom zone. In a second the user can pan the map to the location of the custom zone.

In step 410, the multimedia data associated with the custom zone is presented to the user. It will be appreciated that the multimedia data may be presented when the user is within a predefined distance of the custom zone or when the user is within the boundary of the custom zone. As previously described, the multimedia data may include, for example, pictures, video, descriptions, address information and other predefined information.

Further, as will be appreciated, the multimedia data may be displayed to the user a number of different ways. In one embodiment, the multimedia data replaces the map on the display of the mobile device 102. In another embodiment, the multimedia data is overlaid on top of the map. In this embodiment, the map may be faded or dimmed so that it does not detract too much attention from display of the multimedia data. For both of these embodiments, the user is optionally provided with a button, hot-key, or other input option via the GUI to return to a "map only" view.

Accordingly, it will be appreciated that the embodiments as described above provide the user with an enjoyable interface to the mapping application that provides custom information in addition to positioning information.

Although the previous embodiments described creating a location on the mobile device, it will be appreciated that the zones can be created "remotely", for example at the user's primary computer. In such an example, the custom zones can be loaded onto the mobile device 102 over-the-air or by a wired connection such a Universal Serial Bus (USB) cable when the mobile device 102 is synchronized with the user's primary computer.

Further, although the previous embodiments provide examples of relatively small custom zones, such as the user's home, work or a restaurant, it will be appreciated that the size of the custom zone can vary, as defined by the user when creating the custom zone.

Yet further, the previous embodiments describe a zone application in which the custom zones and their associated multimedia data are stored on the mobile device 102. In an alternate embodiment, the multimedia data and/or custom zone definition information are stored on a central data store, such as the server 108 or the location based server 108a, for example, or in a database readily accessible by the server 108 or the location based server 108a. Each user is provided with an account and assigned a storage area for storing their information. Storing the multimedia data and/or custom zone definition information at the location based server 108b provides the ability to store more data than storing it on the mobile device 102. Memory space on many mobile devices 102 is limited and relatively expensive compared to storage on servers 108. Accordingly, the user would be able to define a large number of custom zones and associate much multimedia data with each custom zone.

Once the custom zone has been created, custom zone definition information and its corresponding multimedia data are delivered to the location based server 108a. The user can add or modify the multimedia data, or make modifications to the custom zone definition, which will be delivered to the location based server 108a as an update.

In one embodiment, standard text data such as the GPS coordinates, the boundaries, notes, addresses and the like are delivered to the location based server 108a over-the-air. More bandwidth intense data such as pictures and video, for example, are delivered to the location based server 108a via a broadband connection, using a wireless or a wired connection. For example, if the mobile device 102 has Wi-Fi capability, a Wi-Fi hotspot or other connection is used to transfer the data. Alternatively, a wired connection such as USB or Firewire cable to a computer having a broadband network connection may be used to transfer the data.

In an alternate embodiment, both the standard text data and the bandwidth intense data are delivered to the location based server 108*a* over-the-air. In yet an alternate embodiment, both the standard text data and the bandwidth intense data are delivered to the location based server 108*a* via a broadband connection.

The location based server 108*a* stores the data for retrieval by the mobile device 102. Optionally, the location based server 108*a* compresses any images and/or video to thumbnails and/or a resolution compatible with the mobile device 102. It will be appreciated by a person skilled in the art that a picture or video used for a custom zone may exceed the resolution capabilities of the mobile device 102. Accordingly, the location based server 108*a* prepares a version of such files that are optimized for the mobile device 102. The original version is maintained on the location based server 108*a*, should the user request access to it.

Once the custom zone definition information and its associated multimedia data is synchronized between the mobile device 102 and the location based server 108*a*, the information can be removed from the mobile device 102 if desired.

In the present embodiment, the location based server 108*a* includes a version of the zone application executing in parallel with, or as part of, its mapping service application. Accordingly, when the location based server 108*a* sends mapping data to the mobile device 102, it follows step 402-408 described with reference to FIG. 4.

The zone application determines when an area defined by one of the custom zones is to be displayed on the screen of the mobile device 102. That is, in accordance with the user's location, does the mapping information to be sent to the mobile device 102 include a custom zone.

If the custom zone is located within the mapping data to be sent, the zone application determines whether or not the custom zone is enabled. If the custom zone is disabled, the custom zone is treated the same as the rest of the mapping information. If the custom zone is enabled, the zone application provides a graphical representation of the custom zone as part of the mapping information.

In the present embodiment, the zone application also transmits the multimedia data associated with the custom zone. In an alternate embodiment, the location based server 108*b* communicates with the mobile device 102 to determine whether or not the multimedia data is already cached on the mobile device 102. If the multimedia data is cached, it is not retransmitted unless explicitly requested by the user.

In the embodiment described above, the custom zone definition information and/or multimedia data are stored on the location based server 108*a* and the mobile device 102 determines when the user approaches a custom zone. In an alternate embodiment, the location based server 108*a* determines when the user approaches a custom zone. This embodiment reduces the demands of the mobile device 102, as it would not require that the zone application be installed on the mobile device 102 nor that the mobile device 102 be aware of the custom zone.

It will be appreciated that by storing the custom zone definition information and associated multimedia data on a central server, size limitations of memory intensive media are reduced. Further, the mobile device 102 is fault tolerant as the custom zones are saved remotely and associated with the user.

Yet further, the user can switch mobile devices 102 or work on a personal computer to create or view the custom zones.

In a further embodiment, the user is provided with an efficient method for sharing custom zone information with another user. Custom zone information includes custom zone definition information and its associated multimedia data. In the present embodiment, the custom zone information is stored on the location based server 108*a*, as described in several of the previous embodiments. However it will be appreciated that the custom zone information can be stored on another server or database.

In the present embodiment, a first user, User A, wishes to share a custom zone with one or more secondary users. For ease of explanation, a single secondary user, User B, is described in the following embodiment. There are many reasons to share data. In one example, User A may want to give directions to User B on how to get to User A's favorite restaurant, where User A is waiting. User A would send the custom zone information for the restaurant to User B. The custom zone information would include the location of the restaurant as well as pictures of the restaurant and hints to find the correct entrance as well as User A's location within the restaurant. User B could use this information to assist finding the both the restaurant and User A.

In another example, User A is a real estate agent and User B is User A's client. User A may want to send property information to User B. User A would send custom zone information for each property of interest to User B. The custom zone information would include the location, information, pictures and virtual tours of the property. User B could use this information to decide which property to pursue further.

However, the problem with sending the custom zone information to User B is that it may be expensive for User A to transfer the data from his/her mobile device 102 to User B. Therefore, in accordance with the present embodiment, a method is provided for sharing the custom zone information while limiting the bandwidth required by User A to do so.

Figure 5:
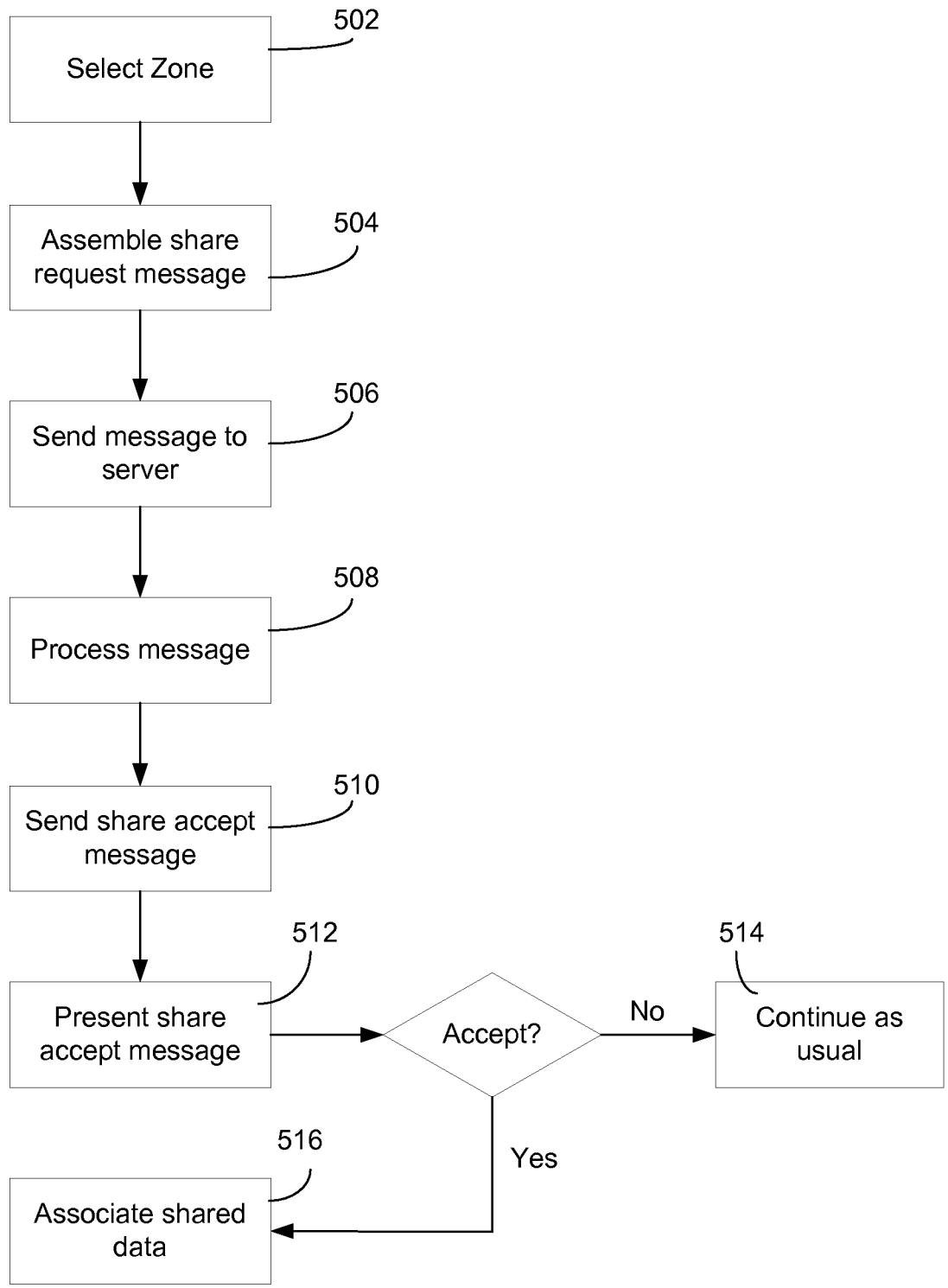
FIG. 5 is a flow diagram illustrating the steps for sharing the custom zone

Referring to FIG. 5, a flow chart illustrating a method for sharing custom zone information is illustrated generally by numeral 500. At step 502, User A selects a custom zone to be shared with User B.

At step 504, the zone application assembles a share request message for the selected custom zone. The share request message includes a zone identifier for uniquely identifying the custom zone to be shared as well as a destination identifier for uniquely identifying User B. The destination identifier may comprise a Personal Identification Number (PIN), e-mail address, phone number, or other identifier associated with User B, as will be appreciated by a person skilled in the art. The share request message may optionally include a message describing the custom zone.

At step 506, the zone application transmits the share request message, which is received at the location based server 108*a*.

At step 508, the location based server 108*a* processes share request message. In the present embodiment, the zone application installed on the location based server 108*a* is configured to process the share request message. It will be appreciated that a separate application executing on the location based server 108*a* could provide this functionality.

In this step, the location based server 108*a* verifies that User A exists as an entity on the communication network 100. Optionally, depending on the implementation, the location based server also verifies that User B exists as an entity on the communication network 100. Verification of User B may be performed to provide an extra level security.

At step 510, the zone application on the location based server 108a transmits a share accept message to User B. The share accept message includes User A information and, optionally information regarding the custom zone to be shared.

At step 512, the share accept message is presented to User B, who has the option of accepting or rejecting the custom zone. If User B rejects the share accept message, the method continues at step 514 and both User B and User A continue as usual. Optionally, at step 514, the location based server 108a advises User A that User B has chosen not to share the custom zone.

If User B accepts the share accept message, the method continues to step 516. At step 516, the location based server 108a adjusts its internal storage mechanism to give User B's account the custom zone information associated with User A's shared custom zone. This can be achieved a number of different ways.

In one example, the location based server 108a physically transfers the custom zone information from User A's account to User B's account. In this example, the location based server 108a may optionally synchronize the shared custom zone information between User A and User B from time to time.

In another example, a reference, such as a pointer for example, can be added to User B's account to identify the shared custom zone and link User B's account with User A's account. Accordingly, in this example, the zone application would automatically access the shared custom zones as well as the custom zones defined by User B when looking for custom zones.

Accordingly it will be appreciated that the transfer mechanism described above facilitates transferring a custom zone from one user to another. The transfer is seamless and does not require the receiver, User B in the examples above, to explicitly obtain anything. Rather, the server 108 treats the shared custom zone information as if it were part of User B's custom zone information.

Further, the transfer incurs a minimal cost to the sender or sharer, User A in the examples above. Specifically, User A is only required to transmit one packet containing an unique identifier for the zone, Users B identifier, and, optionally, a message describing the custom zone.

Because the custom zone information is replicated to a server 108, such as the location based server 108a, one user can share a custom zone with another user while incurring little overhead. This makes the idea of sharing custom zones appeal to an average user who has a low service plan.

As described with reference to FIG. 5, one user, User A, can request to share custom zone information with another user, User B. User A is optionally provided with the ability to tailor which of the custom zone information to share with User B. Therefore, User A can still keep private some information relating to the shared custom zone.

Similarly, once User B has accepted the share accept message, User B can optionally choose which of the custom zone information to accept. Therefore, User B can choose not to accept custom zone information that he/she may feel is irrelevant or would not like to receive due to bandwidth constraints on User B's device.

Further, as described above, User B may have the choice of accepting or rejecting sharing the custom zone via the share accept message. An optional choice available to User B is to tentatively accept the share accept message. In this case, the share accept message is queued for User B. User B can then retrieve the queued share accept message at a later time. Therefore, for example, if User B is using a mobile device 102 when the share accept message is received, he/she can choose to queue the message and view it later from a device that has less bandwidth constraints, such as an Internet-connected desktop computer.

Further, as described above, the location based server 108a optionally verifies User B's account. As a further option, if User B does not have an account he/she is given the opportunity to create one. If User B chooses not to create an account, the custom zone information associated with the shared custom zone may be sent to User B's device to be managed locally.

Yet further, as described above, the location based server 108a requests approval from User B before associating the shared custom zone information with User B's account. In an alternate embodiment, the location based server 108a automatically associates the shared custom zone information with User B's account, without requiring explicit approval. For example, User B may have previously indicated that he/she would accept all shared custom zones, or all shared custom zones from a particular user.

The previous embodiments and examples are described explicitly with reference to sharing custom zone information between users on a network. It will also be appreciated that bulk custom zone information has been shared between users. For example, all custom zones within a city can be shared between User A and User B. If User B is new to the city, the information shared by User A may be help acquaint User B with places in the city. In another example, User A can share all custom zones that represent a specific type of location, such as a restaurant. Various combinations and permutations can be defined for sharing the custom zone information and will become apparent to a person skilled in the art.

Further, it will be appreciated by a person of ordinary skill in the art that the embodiments described above need not be implemented exclusively for custom zone information. That is, they may also be applied to other multimedia data that could be considered bandwidth intensive.

Yet further, as will be appreciated, although User B's device will likely also be a mobile device 102, it may be another computing device such as a notebook or desktop computer.

Yet further, although the previous examples refer only to User A sharing his/her own custom zone information with User B, it will be appreciated that User A may also share custom zone information originally received from a third party. Thus, for example, User B may be able to share User A's custom zone information with User C, if User B is provided with the necessary permissions from User A.

Although a number of different embodiments are described above, it will be appreciated by a person of ordinary skill in the art that various combinations of the different embodiments may also be implemented.

Further, although the invention has been described with reference to certain specific embodiments, various modifications thereof will be apparent to those skilled in the art without departing from the scope of the invention as defined by the appended claims.

The invention claimed is:

1. A method of sharing data, stored on a central data store, between a first user device and a secondary user device, the method comprising the acts of:
   storing on the central data store a plurality of custom zones defined by respective geographical boundaries that are user-defined on a map using one of a plurality of pre-defined boundary shapes or a lasso tool, each custom zone having associated multimedia data and being identified by a respective zone identifier that includes a name of the custom zone;

receiving a share request message from the first user device, the share request message including a selected zone identifier for identifying a selected custom zone and a destination identifier for identifying the secondary user device;

identifying, using the selected zone identifier, the custom zone and the associated multimedia data;

sending a share accept message to the destination identifier, the share accept message providing an option for the secondary user device to accept or reject the data for the selected custom zone which, when accepted, is displayed on the secondary user device in response to the secondary user device displaying a map that is at least partially within the boundary of the selected custom zone;

determining whether the destination identifier has an associated account for accessing the data to be shared;

transmitting the data to be shared to the destination identifier when the secondary user device does not have an associated account.

2. The method of claim 1, wherein the data to be shared is stored in an account associated with the first user device.

3. The method of claim 1, wherein the central data store comprises one or both of a location based server or a repository.

4. The method of claim 1, wherein the destination identifier comprises one or more of a personal identification number, an e-mail address, or a telephone number.

5. The method of claim 1, comprising the further act of verifying that the first user device has an associated account including the data to be shared with the secondary user device.

6. The method of claim 1, comprising the further act of establishing an account for the destination identifier when one does not already exist.

7. The method of claim 1, wherein the share accept message includes a sender identifier for identifying the first user device and the data identifier.

8. The method of claim 7, further including an accept or reject response wherein only a subset of the data to be shared is accepted by the secondary user device and shared by the first and secondary user devices.

9. The method of claim 1, wherein the data to be shared comprises a subset of the custom zone information as defined by the first user device.

10. The method of claim 1, wherein the data to be shared comprises a subset of the custom zone information as selected by the secondary user device.

11. The method of claim 1, wherein the share request message comprises custom zone information relating to a plurality of custom zones.

12. The method of claim 1, wherein the data to be shared is associated with the account associated with the destination identifier by transferring the data to be shared to the account.

13. The method of claim 12, wherein the data to be shared is updated at the account associated with the destination identifier at predefined intervals.

14. The method of claim 2, wherein the data to be shared is associated with an account of the destination identifier by linking the account of the destination identifier with the data to be shared in the account associated with the first user device.

15. The method of claim 1, wherein the destination identifier identifies a plurality of secondary user devices.

16. A non-transitory computer readable storage medium comprising instructions which, when executed on a computer, cause the computer to implement the acts of:

storing on the central data store a plurality of custom zones defined by respective geographical boundaries that are user-defined on a map using one of a plurality of predefined boundary shapes or a lasso tool, each custom zone having associated multimedia data and being identified by a respective zone identifier that includes a name of the custom zone;

receiving a share request message from a first user device, the share request message including a selected zone identifier for identifying a selected custom zone, and a destination identifier for identifying a secondary user device;

and sending a share accept message to the destination identifier, the share accept message providing an option for the secondary user device to accept or reject the data for the selected custom zone which, when accepted, is displayed on the secondary user device in response to the secondary user device displaying a map that is at least partially within the boundary of the selected custom zone;

determining whether the destination identifier has an associated account for accessing the data to be shared;

transmitting the data to be shared to the destination identifier when the secondary user device does not have an associated account.

17. The computer readable storage medium of claim 16 wherein displaying the custom zone information is in response to the secondary user device physically entering the selected custom zone.

18. The computer readable storage medium of claim 16 wherein displaying the custom zone information is in response to the secondary user device panning the map into the selected custom zone.

19. A mobile device comprising:

a user interface for receiving user input to create a plurality of custom zones by defining each custom zone by respective geographical boundaries that are user-defined on a map using one of a plurality of predefined boundary shapes or a lasso tool, wherein each custom zone has a zone identifier including a name of the custom zone;

a processor for associating multimedia data with each custom zone;

a transmitter for transmitting to a central data store the custom zones and the respective zone identifiers;

and wherein the transmitter further transmits, in response to further user input, a share request message that includes a selected zone identifier for identifying a selected custom zone and a destination identifier for identifying a secondary user device to whom to transmit multimedia data for the selected custom zone;

wherein the processor is configured to determine whether the destination identifier has an associated account for accessing the data to be shared and to cause the transmitter to transmit the data to be shared to the destination identifier when the secondary user device does not have an associated account.

20. The mobile device as claimed in claim 19 wherein the processor cooperates with a display to present a prompt to create a new custom zone in response to detecting that a current location of the mobile device corresponds to a predefined location.

* * * * *